United States Patent [19]

Dohrer

[11] Patent Number: 5,093,188

[45] Date of Patent: Mar. 3, 1992

[54] SINGLE-SIDED CLING STRETCH FILM

[75] Inventor: Gregory L. Dohrer, Broken Arrow, Okla.

[73] Assignee: Paragon Films, Inc., Broken Arrow, Okla.

[21] Appl. No.: 462,504

[22] Filed: Jan. 8, 1990

Related U.S. Application Data

[63] Continuation-in-part of Ser. No. 410,635, Sep. 21, 1989, abandoned.

[51] Int. Cl.$^5$ .................. B32B 27/08; B65D 65/40
[52] U.S. Cl. .................... 428/215; 428/220; 428/516; 428/518; 428/331; 264/176.1
[58] Field of Search ............ 428/516, 518, 215, 220

[56] References Cited

U.S. PATENT DOCUMENTS

| | | | |
|---|---|---|---|
| 3,547,754 | 12/1970 | Tokos et al. | 428/220 |
| 4,518,654 | 5/1985 | Eichbauer. | |
| 4,542,188 | 9/1985 | van der Heijden | 525/240 |
| 4,671,987 | 6/1987 | Knott et al. | |
| 4,820,589 | 4/1989 | Dobreski et al. | 428/520 X |
| 4,833,017 | 5/1989 | Benoit | 428/520 X |

FOREIGN PATENT DOCUMENTS

0317166-A 5/1989 European Pat. Off. .

*Primary Examiner*—P. C. Sluby
*Attorney, Agent, or Firm*—Pravel, Gambrell, Hewitt, Kimball & Krieger

[57] ABSTRACT

This invention relates to a single-sided cling stretch wrap film having an A/B/C structure. The surface of the A layer exhibits a high cling force to the surface of the B layer which has a high tensile strength. The surface of the C layer is cling-free. Pallet loads overwrapped with the film are neither torn or destroyed when separated from each other.

19 Claims, No Drawings

SINGLE-SIDED CLING STRETCH FILM

This is a continuation-in-part application of U.S. patent application Ser. No. 410,635, filed Sept. 21, 1989, now abandoned.

FIELD OF THE INVENTION

This invention is drawn to single-sided cling stretch wrap films of high tensile strength having an A/B/C film structure, wherein the A surface exhibits cling properties, the B layer is primarily responsible for the high tensile strength of the film structure and the C layer is substantially cling free. In addition, layer C has a slide property when its surfaces are in contact with relative motion with a second layer of C.

BACKGROUND OF THE INVENTION

One of the problem areas in the packaging industry concerns the overwrap packaging of goods, particularly the unitization of pallet loads. Ideally, an overwrap material should have high strength, be resistant to tear and puncture, and exhibit single-sided cling properties. In particular, single-sided cling properties are required in order to prevent individual pallets from clinging to each other and being torn or destroyed when being separated from each other.

Development of single-sided cling has, generally, been directed toward surface modifying one side of an A/B film. For example, U.S. Pat. No. 4,820,589 discloses an A/B film structure, wherein the A layer has a comparatively high cling force to layer B and layer B has substantially less cling force to a layer of itself. The B layer contains nylon. Further, single and two-layer film structures are further disclosed in U.S. Pat. Nos. 4,518,654 and 4,833,017, herein incorporated by reference. In U.S. Pat. No. 4,518,654, the "non-cling" B layer is a polyolefin with an anti-cling additive such as crystalline or amorphous silica, sodium aluminum silicate, diatomaceous earth, and talc. It is not possible to obtain a zero cling force for the B layer, however, since the additive must be present in minimal quantities in order to prevent tearing or fracturing of the film. Further, the coefficient of friction of such films is greater than 2.0 which indicates an unfavorable slideability property of the B layer. Also further, the minimum stretch capability of such films is approximately 50%. Thus, such films neither exhibit a truly cling-free layer or the maximum tensile strength and minimum stretch capability which is commercially demanded.

In order to prevent the tearing or loosening of the wrapping on stacked overwrapped pallet loads, it would be highly desirable to have a tough film exhibiting high tensile strength and greater elongation with good cling properties on one side to engage the contained load and little or no cling properties on the other side to avoid clinging to neighboring stacked, wrapped loads.

SUMMARY OF THE INVENTION

The invention comprises novel stretch wrap films and an improved process for preparing such films. In particular, the stretch wrap films of this invention are (1) exhibit high tensile strength and an improved minimum stretch capability, (2) are tear and puncture resistant, and (3) have single sided cling. Such films are ideally suited for use in overwrapping of packages and pallet loads.

The stretch wrap film of this invention comprises a thermoplastic A/B/C film structure of differential cling wherein layer A has a high cling force to layer B, layer B is a core layer with high tensile strength, and layer C has little, if any, cling properties.

The stretch wrap film is prepared as a co-extrusion product of the A/B/C layers.

DETAILED DESCRIPTION OF THE INVENTION

The invention comprises a single-sided cling stretch wrap film. In order to achieve the desired single-sided cling properties a co-extruded A/B/C film structure was utilized. Layer B is bonded through the co-extrusion process to layers A and C. Layer B is characterized by a high tensile strength and is chiefly responsible for rendering high tensile strength to the film structure of this invention. The thermoplastic film structure of this invention exhibits a machine directional tensile strength between about 4,000 to about 12,000 psi, as measured by ASTM D 882. In addition, the film structure of this invention has a minimum stretch capability of about 200%, and a maximum stretch capability of about 600%, preferably between 350 and 450%, as measured by ASTM D4649 (A1.2.2). Such minimum stretch capability is needed due to the continuous stretching of the film roll caused by the braking tension applied to the roll after the film is laid about the girth of the pallet platform during overwrapping. The surface of the C layer is cling-free.

The cling force of the A surface of the film structure of this invention to the A surface of a like A/B/C film (of identical composition) is between about 150 g to about 400 g. (Cling force measurements referred to herein are in accordance with ASTM D4649 wherein the surfaces of the films are in a stretched condition.) The cling force of the A surface to the C surface of a like A/B/C film is between about 100 g to about 350 g. The cling force of the C surface of the film structure of this invention to the C surface of a like A/B/C film is negligible and ideally is not detectable. Further, layer C is characterized by a slide property when it is in contact with a layer of itself with relative motion therebetween. The coefficient of friction of the C surface to the C surface of a second (like) film is between about 0.2 to about 2.0, and most preferably is less than 1.0, as measured by ASTM 1894.

The film should have an A to B to C weight ratio of from about 5:90:5 to about 30:40:30, most preferably about 10:80:10. The film will have an overall thickness ranging from about 0.3 mil to about 3.0 mil, preferably 0.8 mil. In general, the thickness of the A layer is between about 0.025 to about 0.9 mils. The thickness of the B layer is between about 0.020 to about 2.7 mils and the thickness of the C layer is between about 0.025 to about 0.9 mils.

The A layer for use in the present invention is fabricated from a resin possessing an inherent cling property and/or a cling property resulting from the incorporation of a cling additive. Examples of such resin film-forming compositions are polyolefins such as polyethylene, polypropylene, copolymers of ethylene and propylene, and polymers obtained from ethylene and/or propylene copolymerized with relatively minor amounts of an ethylenically unsaturated monomer such as a mono-olefin, preferably a $C_4$-$C_{12}$ mono-olefin, such as butene-1 and isobutylene, acrylic acid, methacrylic acid, esters of acrylic acids, vinyl acetate, styrene and combinations thereof. Preferred is polyethylene, including high and low molecular weight polyethylene and copolymers thereof.

Particularly preferred for the cling film portion of the stretch wrap film of the present invention are those resin-forming systems which do not exhibit a fairly high level of cling without the addition of a cling additive such as linear low density polyethylene (LLDPE). LLDPE is defined as having a maximum density ranging from about 0.890 g/cc to about 0.930 g/cc, preferably about 0.917 g/cc. LLDPE, characteristically has a melt flow value (ASTM D 1238 Cond. E) ranging from about 0.3 to about 10.0, preferably about 2.3, and is a copolymer of ethylene with a $C_4$–$C_{10}$ olefin, for example, butene-1; 1,3-dimethyl-butene-1; 1,3-dimethyl-pentene-1; hexene-1; 4-methyl-penetene-1; 3-methyl-hexene-1; octene-1; or decene-1. The alpha-olefin is usually between 1 to 20 weight percent of the copolymer. Further, ultra low density polyethylene (ULDPE) is also particularly preferred. ULDPE is defined as having a maximum density ranging from about 0.890 g/cc to about 0.915 g/cc, preferably about 0.912 g/cc and contains a higher percentage of the $C_4$–$C_{10}$ olefin.

Resins not inherently possessing cling properties can nevertheless be used in this invention by incorporating with the resin a cling additive.

The resin film-forming film of the A layer may contain any known cling agent which will be effective in maintaining the A layer in cling contact with the surface of the C layer of a second A/B/C film of like composition while both are in the stretched condition. Non-limiting examples of cling additives include, for example, such tackifiers as polybutene and low molecular weight polyisobutylene, preferably between 200–3000, most preferably 200–300. Other suitable tackifers include polyterpenes, amorphous polypropylene, ethylene vinyl acetate copolymers, microcrystalline wax, alkali metal sulfosuccinates, and mono- and di- glycerides of fatty acids, such as glycerol monostearate, glycerol monooleate, sorbitan monolaurate, sorbitan monopalmitate, sorbitan monostearate and sorbitan monooleate. Preferably, the tackifier is polybutene. Most preferably the butene is admixed with LLDPE such that from about 20 weight percent to about 70 weight percent, preferably about 50 weight percent, of the admixture is polybutene.

The cling additive can be present in the A layer in any concentration which will permit the A surface to cling to the C surface of a second A/B/C film of like composition or other surfaces, while in its stretched condition. A preferred concentration can range from about 0.1 to 20% by weight of the A layer, most preferably between 0.25 to 6.0 weight percent.

The B layer exhibits a minimum machine directional tensile strength value ranging from about 4,000 psi to about 12,000 psi, preferably about 7,000 psi, as measured by ASTM D882. Suitable as the resin film-forming composition for the B layer for use in this invention are polyolefins such as polyethylene, polypropylene, copolymers of ethylene and/or propylene and a minor amount of a $C_4$–$C_{12}$ mono-olefinic monomer such as butene-1 and isobutylene. Especially preferred is LLDPE, as defined herein. The B layer is most preferably chemically distinct from the film-forming resins of layers A and C, i.e. the film-forming resins of layers A and C are not identical to the film-forming resin of layer B. In the most preferred embodiment of the invention the film is fabricated from three chemically distinct resin film-forming systems.

The film-forming component of the C layer imparts to the film structure a noncling-slip surface. While any thermoplastic film can be employed which will render a noncling-slip surface, most preferred are polyolefins. Particularly desirous results are obtained with polypropylene. As explained more fully below, a resin film-forming comprising polypropylene and between 10 to about 50 weight percent high density polyethylene (HDPE) is especially preferred. A HDPE has a maximum density greater than or equal to 0.940 g/cc and is a homopolymer of ethylene.

In addition to polypropylene, styrene-butadiene as well as other polyolefins can be employed as the resin film-forming system of the C (skin) layer. Such polyolefins include ultra low density polyethylene (ULDPE), LLDPE, low density polyethylene and copolymers thereof also including medium density polyethylene (MDPE) These materials are defined as having a density ranging from about 0.890 to about 0.980 g/cc and a melt index ranging from about 0.4 to about 20. MDPE is defined as having a minimum density ranging from about 0.925 to about 0.940, preferably about 0.935. ULDPE and MDPE are copolymers of ethylene and at least one of the $C_4$–$C_{10}$ olefins recited above. (It is well recognized in the art that LLDPE, MDPE and ULDPE are copolymers of ethylene and an alpha olefin comonomer and that the density of the copolymer decreases as the amount of comonomer increases.) When such polymers are employed, however, it is often necessary to use an antiblock agent in order to obtain a A/C and C/C cling force within the desired limitations as stated herein. Suitable antiblock agents include those containing silicon such as calcium silicate, silicon dioxide (most preferably 0.5 to 10 wt. % $SiO_2$ in. LLDPE) as well as such crystalline and amorphous silicates as $Na_2O \cdot Al_2O_3 \cdot SiO_2 \cdot 4H_2O$, bentonite, diatomaceous earth, clay and talc. In addition, such organic materials, as starches, preferably those having an average particle size from about 10 to about 200 millimicrons, can be employed. Such antiblock agents should be evenly distributed and should be added in such quantities as to impart to the film structure as undetectable C/C cling force. Normally, the presence of an antiblock agent in excess of 2.0 weight percent is undesirable since greater amounts initiate tear and/or fracture thereby compromising the tear and puncture resistant properties of the total film structure.

The stretch wrap films of this invention are formed by conventional techniques of coextrusion to assemble the composite structure, such as by the simultaneous coextrusion of resin film-forming layers A, B and C. The A layer is preferably between 5 and 15 weight % of the overall film thickness; the B layer is between 70 and 90% of the overall film thickness; and the C layer is between 5 and 15% of the overall film thickness. The melt temperature for each extruder is independently selected such that the viscosity of the different film components is matched. In such co-extrusion processes, the three extruders should be operating simultaneously to produce the coextruded film. Thus, the output capacity for each of the three extruders should be close to equivalent. For example, to produce a 10:80:10 (w/w) A/B/C film structure, if the core (center) extruder for layer B is relatively small (1.5 inch diameter, 24:1 L:D) then the satellite extruders for layers A and C must be proportionately smaller. If on the other hand the core extruder is relatively large (6 inch diameter, 30/1 L/D) then the size of the satellite extruders must be increased in order for the film layer ratios to remain relatively constant. In addition, the melt viscosity of all three components must be approximately the same. Generally, the viscosity of the resin forming systems of layers A and C are matched to the viscosity of the resin film-forming system of layer B. Thus, if the viscosity of the resin in the A or C extruder is lower than that of the core layer at any given temperature, then its melt temperature must be reduced to increase its viscosity. If the viscosity of the resin in the A or C extruder is higher than that of the resin film-forming system of the B layer, then its melt temperature must be increased to decrease its viscosity. Since each extruder of the film-forming system B operates at a separate melt temperature, the temperature profile of the zones in each extruder will likewise differ.

In preparing the A/B/C extrudate of the present invention, the resin film-forming systems of layers A/B/C, if any, are fed into the feed hopper of a conventional rotating screw extruder. The polypropylene is melted by working it in the compression zone of the extruder. The molten polypropylene is continuously advanced through the metering zone to the mixing zone of the extruder.

It is readily recognized in the art that the production of thicker extrudates either requires an operator to increase the speed of the extruder or decrease the line speed, i.e. the rate the extrudate is removed from the dye. Modern extrusion apparatus naturally have maximum speeds and minimum line speeds that can complicate the process. As previously stated the viscosity of the resin film-forming system of the layers of the film structures of this invention are approximately the same during co-extrusion. The melt viscosity of polypropylene, the preferred resin film-forming system of the C layer, rapidly decreases with an increase in temperature. The inventor discovered that the addition of between about 10 to about 50 weight percent (based on total weight percent of resin film-forming system) of high density polyethylene to polypropylene dramatically reduced the extruder speed. In addition, the viscosity of the resin film-forming system containing the high density polyethylene/polypropylene blend is similar to that of the resin film-forming compositions which do not contain high density polyethylene. Thus, high density polyethylene serves as an invaluable processing aid to molten extrudates of polypropylene. Most preferably the resin film-forming system comprises approximately 30 weight percent of high density polyethylene. While the use of high density polyethylene with polypropylene is preferably realized in the fabrication of the C layer of the A/B/C film structure of this invention, it is also within the scope of this invention to provide a single film or A/B film structure or even a laminate with such composition. Thus, the use of the high density polyethylene/polypropylene blend is not restricted to the production of layer C of an A/B/C film structure but is equally applicable to the cling-free layer of an A/B film structure such as those disclosed in the prior art cited and discussed herein. Thus, in the fabrication of an A/B stretch wrap film wherein layer B is the cling-free layer comprising polypropylene, the high density polyethylene in the quantities stated above can be admixed with the polypropylene. Likewise, the processing aid can be used in the fabrication of single layer films of polypropylene in the stated quantities.

EXAMPLES

General Procedure

In preparing the A/B/C extrudates of the present invention any known prior art technique for coextrusion can be employed. The resin film-forming composition of each layer is fed into the feed hopper of a conventional rotating screw extruder. The extruder screw employed can have approximately a 5 inch diameter and a length to diameter, L/D, ratio of about 30:1. Satellite extruders are used for the coextrusion of the resin film-forming compositions A and C. The satellite extruders comprise a conventional extruder having an extruder screw with about a 2.5 inch diameter and a L/D ratio of about 30:1. Molten resin from the satellite extruders are fed into the case film die affixed to the end of the B extruder through an adapter specifically designed to join polymer streams A and C from the satellite extrudates to the molten B polymer stream so that it effectively interfaces with the molten surface of the B layer. The slots coextrudant film had a gauge of ~5 mil at a melt temperature of approximately 420° F. (A layer), 510° F. (B layer), and 480° F. (C layer).

Glossary

As used herein, the materials recited in these Examples are commercially available. In the examples the actual material used is indicated by reference to the corresponding glossary number.

| MATERIAL | DENSITY | MELT FLOW | COMMERCIALLY AVAILABLE AS | SOURCE |
|---|---|---|---|---|
| 1. Polypropylene | | | 3014 | Exxon Chemical Co. |
| 2. Polypropylene | | | 5A08 | Shell Oil Co. |
| 3. Polypropylene | | | 7C49 | Shell Oil Co. |
| 4. Polypropylene | | | 4062 | Exxon Chemical Co. |
| 5. Polypropylene | | | HGX-030 | Philips Pet. Co. |
| 6. Polypropylene | | | RMN-020 | Philips Pet. Co. |
| 7. Polypropylene | | | 2104 | Soltex, Inc. |
| 8. Polypropylene | | | 4207 | Soltex, Inc. |
| 9. Polypropylene | | | 6C44 | Shell Oil Co. |
| 20. LLDPE | 0.917 | 2.3 | 2047 | Dow Chemical Co. |
| 21. LLDPE | 0.935 | 2.5 | 2036A | Dow Chemical Co. |
| 22. LLDPE | 0.926 | 2.0 | 2032 | Dow Chemical Co. |
| 23. LLDPE | 0.912 | 3.3 | 4004 | Dow Chemical Co. |
| 30. Tackifier (52% of polybutene in LLDPE) | | | | Santech Co. |
| 35. Styrene-Butadiene Copolymer | | | KR-10 | Phillips Pet. Co. |
| 40. Methacrylic acid copolymer (MMA) - a copolymer of ethylene and approximately 20–30 wt. % methacrylic acid, commercially | | | | |

| MATERIAL | DENSITY | MELT FLOW | COMMERCIALLY AVAILABLE AS | SOURCE |
|---|---|---|---|---|
| known as XC-102[40] and XC-101[41] from Exxon Chemical Company. | | | | |

Example 1

Film 1 has a composition as follows: Layer A (15% by weight of total film) is LLDPE[23] with 6% tackifier[30]; Layer B is LLDPE[20] (approximately 70% by weight of total film); and Layer C (15%) is LLDPE[20] with 0.5% silicon dioxide. The cling properties are presented in Table 1.

Example 2

Film 2 has the same composition as Film 1, except that Layer C is LLDPE. The cling properties are presented in Table 1.

Example 3

Film 3 has the same composition as Film 1, except that Layer C is MDPE[20]. The cling properties are presented in Table 1.

Example 4

Film 4 has the same composition as Film 1, except that Layer C is a polypropylene homopolymer[2].

TABLE I

| | CLING (g) | |
|---|---|---|
| Example | A/A | C/C |
| 1 | 325 | 25 |
| 2 | 230 | 170 |
| 3 | 270 | 70 |
| 4 | 325 | (NA)* |

Table 1 is illustrative of some of various approaches taken in the past concerning the non-cling surface of single-sided cling film. Example 2 shows that LLDPE is not a preferred material due to its substantial cling to itself. Example 1 shows that addition of non-cling additives provide enhancement of the desired non-cling property. Example 3 shows that an increase in the density has limited enhancement of non-cling properties. Example 4, on the other hand, shows true non-cling properties. The standard test for cling (ASTM D4649) cannot be used to quantitate the cling properties of this material, as a result a more sensitive test to measure the coefficient of friction (ASTM D1894) was employed.

Comparative Examples 5-8 and Examples 9-10

Resin film-forming compositions were prepared as extrudates in accordance with the General Procedure above. The thickness of layers A, B, and C were the same as recited in Example 1. Percentages are weight percentages. The speed of the extruder is indicated. Table II reports the cling data ASTM D4649, Standard Guide for Selection of Stretch Wrap Materials:

| | COMP EX 1 | COMP EX 5 | COMP EX 6 | COMP EX 7 | COMP EX 8 | EX 9 | EX 10 |
|---|---|---|---|---|---|---|---|
| A layer, MMA[40], wt % | 10 | 5 | 10 | 15 | 20 | 5 | 10 |
| B layer, LLDPE, wt % | 80 | 85 | 80 | 75 | 70 | 85 | 80 |
| C layer, Polypropylene wt % | 10 | 0 | 0 | 0 | 0 | 5 | 5 |
| C layer, HDPE, wt % | 0 | 10 | 10 | 10 | 10 | 5 | 5 |
| Extruder A rpm | 35.8 | 30 | 30 | 30 | 30 | 30 | 30 |
| Extruder B rpm | 47.8 | 30 | 30 | 30 | 30 | 30 | 30 |
| Extruder C rpm | 111.9 | 30 | 30 | 30 | 30 | 30 | 30 |
| Cast Roll, Ft. per min. | 746 | 380 | 380 | 380 | 380 | 371 | 311 |

TABLE II

| | % STRETCH | | |
|---|---|---|---|
| EXAMPLE | 100 | 150 | 200 |
| 5 | Poor | None | — |
| 6 | Fair | Poor | None |
| 7 | Fair | None | — |
| 8 | Fair | Poor | None |
| 9 | Fair | Fair | Fair |
| 10 | Fair | Fair | Fair |

Examples 11-19

The films were prepared in accordance with the procedures of Comp. Exs. 5-8 and Examples 9-10 above. 10% of the film comprised layers A and C and 80% layer B. Respective cling forces are compiled in Table III. Data for coefficient of friction is compiled in Table IV.

| EX. | A LAYER | B LAYER | C LAYER |
|---|---|---|---|
| 11 | Methacrylic Acid Copolymer[41] | LLDPE[20] | LLDPE[11] |
| 12 | Methacrylic Acid Copolymer[42] | LLDPE[20] | Styrene-butadiene[35] |
| 13 | 94% LDPE[23] 6% polybutene[30] | LLDPE[20] | Polypropylene[7] |
| 14 | 94% LDPE[23] 6% polybutene[30] | LLDPE[20] | Polypropylene[8] |
| 15 | 94% LDPE[23] 6% polybutene[30] | LLDPE[20] | Polypropylene[2] |
| 16 | 94% LDPE[23] 6% polybutene[30] | LLDPE[20] | Polypropylene[3] |
| 17 | 94% LDPE[23] 6% polybutene[30] | LLDPE[20] | Polypropylene[1] |
| 18 | 94% LDPE[23] 6% polybutene[30] | LLDPE[20] | Polypropylene[4] |
| 19 | 94% LDPE[23] 6% polybutene[30] | LLDPE[20] | Polypropylene[5] |

TABLE III

| EX. | A/A | A/C | C/C |
|---|---|---|---|
| 11 | 364 ± 96 | 225 ± 42 | NA |
| 12 | 35 | 40 | NA |
| 13 | 280 ± 51 | 143 ± 39 | NA |
| 14 | 176 ± 28 | 157 ± 16 | NA |
| 15 | 324 ± 72 | 198 ± 66 | NA |

TABLE III-continued

| EX. | A/A | A/C | C/C |
|---|---|---|---|
| 16 | 513 ± 55 | NA | NA |
| 17 | 347 ± 50 | 191 ± 28 | NA |
| 18 | 217 ± 11 | 124 ± 24 | NA |
| 19 | 442 ± 20 | 192 ± 81 | NA |

TABLE IV

| EX. | |
|---|---|
| 11 | 0.55 |
| 14 | 0.59 |
| 15 | 0.49 |
| 16 | 0.70 |
| 17 | >2.0 |
| 18 | 0.65 |
| 19 | 0.51 |

Example 20-22

The number of breaks a 1500 foot roll of 20/30 inches wide of the film structure prepared in Example 10 having a total thickness of 0.8 mils was determined by using a pallet wrapper commercially available from Lamtech, Inc. of Louisville, Ky. The film was prestretched 225% by making the second prestretch roller run 2¼ times the rpm of the first roller. Minimal relaxation was permitted. The number of breaks in every 1500 feet of film was determined, ASTM 4649.

| | Example* 20 | Example 21 | Example 22 |
|---|---|---|---|
| % stretch (measured on pallet) | 210 | 220 | 210 |
| width of roll/inches | 20 | 30/20** | 30/20** |
| No. of breaks | 0 | 0 | 0 |

*4 rolls tested
**3 rolls tested - 2 at 30 inches; 1 at 20 inches

The invention has been described with reference to its preferred embodiments. From this description, a person of ordinary skill in the art may appreciate changes that could be made in the invention which do not depart from the scope and spirit of the invention as described above and claimed hereafter.

What is claimed is:

1. A stretch wrap thermoplastic A/B/C film comprising an A surface having a high cling force to the surface of layer C and a C layer having a substantially non-cling surface, wherein said C layer is fabricated from a resin film-forming system mixture consisting essentially of polypropylene and high density polyethylene said A layer is a polyolefin or a copolymer obtained from (i) ethylene, propylene or ethylene and proylene and (ii) an ethylenically unsaturated monomer and said B layer is a polyolefin which exhibits a tensile strength between about 4,000 to about 12,000 psi.

2. The stretch wrap film of claim 1, wherein the cling force of the A surface to the A surface of a like A/B/C film as measured according to ASTM D4649 is between about 150 to about 400 g.

3. The stretch wrap film of claim 1, wherein the cling force of the A surface of said film to the C surface of a second like A/B/C film as measured according to ASTM D4649 is between about 100 to about 350 g.

4. The stretch wrap film of claim 1, wherein the cling force of the C surface of said film to the C surface of a second like A/B/C film according to ASTM D4649 is approximately zero.

5. The stretch wrap film of claim 4, wherein the coefficient of friction of the C surface of said film to the C surface of a second like A/B/C film as measured according to ASTM 1894 is less than 2.0.

6. The stretch wrap film of claim 5, wherein said coefficient of friction is less than 1.0.

7. The stretch wrap film of claim 1, further comprising a B layer having a tensile strength between about 4,000 to about 10,000 psi.

8. The stretch wrap film of claim 1, wherein the A:B:C weight ratio is between from about 5:90:5 to about 30:40:30.

9. The stretch wrap film of claim 8, wherein the A:B:C ratio is approximately 10:80:10.

10. The stretch wrap film of claim 1, wherein said B layer is fabricated from a polyolefin selected from the group consisting of polyethylene, polypropylene and a copolymer of ethylene, propylene and a $C_4$-$C_{12}$ monoolefin.

11. The stretch wrap film of claim 10, wherein said polyolefin is linear low density polyethylene.

12. The stretch wrap film of claim 10, wherein said C layer is fabricated from a polypropylene.

13. The stretch wrap film of claim 10, wherein said C layer is fabricated from a film-forming system comprising a polyolefin selected from the group consisting of linear low density polyethylene, low density polyethylene and medium density polyethylene.

14. The stretch wrap film of claim 13, wherein said film-forming system further comprises an anti-block agent in an amount sufficient to render a cling force of approximately zero.

15. The stretch wrap film of claim 1, wherein between 10 to 50 weight percent of said resin film-forming system mixture comprises high density polyethylene.

16. The stretch wrap film of claim 15, wherein said resin film-forming system mixture comprises approximately 30 weight percent high density polyethylene.

17. The stretch wrap film of claim 1, wherein said film has a minimum stretch capability of 200%.

18. In a stretch wrap film having one-sided cling comprising a thermoplastic A/B layer film structure where, with the surfaces of A/B in their stretched condition, the A surface comprising a polyolefin or a copolymer obtained from (i) ethylene, propylene or ethylene and propylene and (ii) an ethylenically unsaturated monomer has a comparatively high cling force to the surface of B and the surface of B has no cling to itself, and has a slide property where the surface of B is in contact with itself with relative motion therebetween, the improvement comprising the fabrication of the B layer from a resin film-forming system comprising polypropylene and between about 10 to about 50 weight percent of high density polyethylene.

19. The stretch film of claim 18, wherein said resin film-forming system comprises approximately 30 weight percent of high density polyethylene.

* * * * *